United States Patent
Pozzi

(10) Patent No.: US 8,695,136 B2
(45) Date of Patent: Apr. 15, 2014

(54) SEAT CUSHION WITH DISTRIBUTED FLOTATION FOAM USE IN AIRCRAFT SEATS

(75) Inventor: Alexander N. Pozzi, Winston-Salem, NC (US)

(73) Assignee: BE Aerospace, Inc., Wellington, FL (US)

(*) Notice: Subject to any disclaimer, the term of this patent is extended or adjusted under 35 U.S.C. 154(b) by 162 days.

(21) Appl. No.: 13/404,121

(22) Filed: Feb. 24, 2012

(65) Prior Publication Data

US 2013/0225019 A1  Aug. 29, 2013

(51) Int. Cl.
B32B 3/12 (2006.01)
A47C 7/18 (2006.01)

(52) U.S. Cl.
USPC ............. 5/653; 5/655.9; 5/740; 428/308.4; 264/45.3

(58) Field of Classification Search
USPC .................... 5/653, 655.9, 740; 264/45.3; 297/DIG. 1; 428/308.4, 313.5, 319.5
See application file for complete search history.

(56) References Cited

U.S. PATENT DOCUMENTS

| | | | | |
|---|---|---|---|---|
| 2,147,362 A * | 2/1939 | Bloomberg | ........... | 521/54 |
| 3,607,797 A * | 9/1971 | Rubens et al. | ........... | 521/59 |
| 3,840,628 A * | 10/1974 | Stastny et al. | ........... | 264/45.4 |
| 3,878,133 A * | 4/1975 | Rubens | ........... | 521/59 |
| 4,190,697 A * | 2/1980 | Ahrens | ........... | 428/309.9 |
| 4,374,885 A * | 2/1983 | Ikeda et al. | ........... | 428/160 |
| 4,726,086 A * | 2/1988 | McEvoy | ........... | 5/653 |
| 4,945,591 A | 8/1990 | Inagaki | | |
| 5,885,693 A * | 3/1999 | Eder et al. | ........... | 428/160 |
| 6,319,441 B1 * | 11/2001 | Yates | ........... | 264/113 |

FOREIGN PATENT DOCUMENTS

JP  2004-236857 A  8/2004
WO  WO 2007/079230 A2  7/2007

OTHER PUBLICATIONS

International Search Report dated May 15, 2013 for Application No. PCT/US2013/026841.

* cited by examiner

*Primary Examiner* — Michael Trettel
(74) *Attorney, Agent, or Firm* — Shumaker, Loop & Kendrick, LLP

(57) ABSTRACT

A seat cushion including a soft foam cushion constructed from open cell foam for comfort, and a plurality of closed cell foam pieces distributed within the open cell foam cushion for flotation and structural support, such as for use as a bottom cushion on an aircraft seat.

19 Claims, 4 Drawing Sheets

SEAT CUSHION WITH DISTRIBUTED FLOTATION FOAM USE IN AIRCRAFT SEATS

TECHNICAL FIELD OF THE INVENTION

The present invention relates generally to the field of seat cushion construction, and more particularly, to a seat cushion including small pieces of closed cell foam distributed within a softer, open cell cushion, such as for use as a bottom cushion on an aircraft seat.

BACKGROUND OF THE INVENTION

Flotation foam is required in aircraft seat cushions to meet certain FAA flotation requirements in order to serve as a flotation device in the event of an emergency. As illustrated in FIG. 4, conventional bottom cushions 10 on aircraft seats typically include all of their flotation foam formed as a slab 12 that is bonded to the underside of more comfortable open cell foam 14. The open cell foam cushion 14 may also include a layer of structural foam bonded to its underside. The cushion 10 may include additional layers as well, such as adhesives layers, insulating layers and fire blocking layers/coatings. The cushion 10 is typically covered with durable upholstery for aesthetic purposes and to protect the underlying foam.

The foam slab 12 is typically constructed from closed cell foam, such as polyethylene, and has a thickness of about a few centimeters. Because the closed cell foam is relatively rigid, it is typically positioned away from the passenger to prevent discomfort. The open cell foam 14 is typically constructed from polyurethane for softness and comfort, and has a thickness significantly greater than that of the flotation foam slab 14 for providing comfort and preventing contact with the underlying flotation foam. Although the open cell foam thickness is typically sufficient for comfort for lightweight passengers and short flight times, heavier passengers and longer flights can cause the comfort foam to compress to the point that hard points are felt by the passenger. Although one solution to the compression problem may be to simply increase the thickness of the comfort foam, this solution is not practical or possible given seat designs and space constraints of typical seat installations.

The structural foam is also necessary to reduce the load on the occupant's lumbar region during an emergency landing scenario. The FAA requires a 14 g crash test to simulate such as event, in which all parts of the seat must remain intact. Compressive load to the occupant's lumbar region must also be minimized. The structural foam decelerates the occupant so that when the occupant strikes the metal or composite structure below the foam, the impulse load is less than if no structural foam was present.

In addition to compression problems, rigid closed cell foam slabs are substantially impenetrable to air and moisture, and thus form a barrier that prevents air and moisture from passing through the cushion for drying and wicking away moisture. While the seat upholstery is intended to be substantially water-resistant, moisture may still seep through the upholstery and the seams. The underlying open cell foam acts much like a sponge in absorbing water, and absorbed moisture increases the weight of the seat, affects the performance of the cushion, causes the foam to deteriorate, and makes the seat uncomfortable.

Accordingly, there is a need for improved seat cushion construction that increases seat performance, reduces seating discomfort associated with conventional flotation foam slabs, and improves the breathability of the seat cushion.

BRIEF SUMMARY OF THE INVENTION

In one aspect, a seat cushion is provided herein for use in aircraft seats.

In another aspect, the seat cushion serve as a bottom cushion flotation device in an aircraft seat.

In yet another aspect, the seat cushion is constructed from a soft comfort foam having a predetermined density and compressibility with relatively small flotation foam pieces distributed within the soft foam having a lesser compressibility than that of the soft foam.

In yet another aspect, the seat cushion allows air and moisture to pass through substantially the entire thickness of the cushion.

To achieve the foregoing and other aspects and advantages, the seat cushion in one embodiment includes an open cell foam cushion for comfort having a plurality of closed cell foam pieces distributed within the open cell foam cushion for providing flotation to the seat cushion. The plurality of closed cell foam pieces may be substantially evenly distributed within the open cell foam cushion or may be arranged according to a predetermined pattern. The seat cushion may include a greater density of the plurality of closed cell foam pieces adjacent the bottom of the cushion than it does adjacent the top of the cushion to provide flotation and structural support to the bottom of the cushion.

Each of the plurality of closed cell foam pieces may range in size from about $0.0015$ cm$^3$ to about $20$ cm$^3$, depending on the overall size and thickness of the cushion. The plurality of closed cell foam pieces may collectively comprise from about 5 to 50% of the total volume of the seat cushion.

The plurality of closed cell foam pieces may have substantially the same shape or different shapes. In one embodiment, each of the plurality of closed cell foam pieces has substantially a donut shape with a degree of flexibility and spring for increasing the level of comfort and resiliency of the cushion. Alternative closed cell foam piece shapes can include spherical, elongated spherical, cylindrical, tubular, spiraled, coiled, star shaped mace, complex shapes, etc.

The open cell foam cushion may be constructed from polyurethane and the plurality of closed cell foam pieces may be constructed from polyethylene.

In another embodiment, an aircraft seat cushion is provided herein including a soft foam cushion for providing comfort for a passenger and a plurality of closed cell foam pieces distributed within the soft foam cushion for providing flotation and structural support to the seat cushion. The plurality of closed cell foam pieces serve as flotation foam and can be substantially evenly or randomly distributed within the soft foam cushion. The seat cushion can function as an FAA approved flotation device.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The seat cushion embodiments shown and described herein can be used in aircraft seats and other seating applications in which a more comfortable, durable, breathable and resilient seat cushion is desired. The seat cushion embodiments provided herein are particularly well suited for use in aircraft seats requiring FAA flotation-compliant cushions. In an aircraft installation, the cushion embodiments provided herein may be used in at least one of the bottom and back cushions of the seat, as well as other applications. Although the foam portions of the cushion are described in detail herein, it is envisioned that the cushion may include additional components such as additives, coatings, coverings, adhesives, water-blocking layers, insulting layers, etc.

Figure 1:
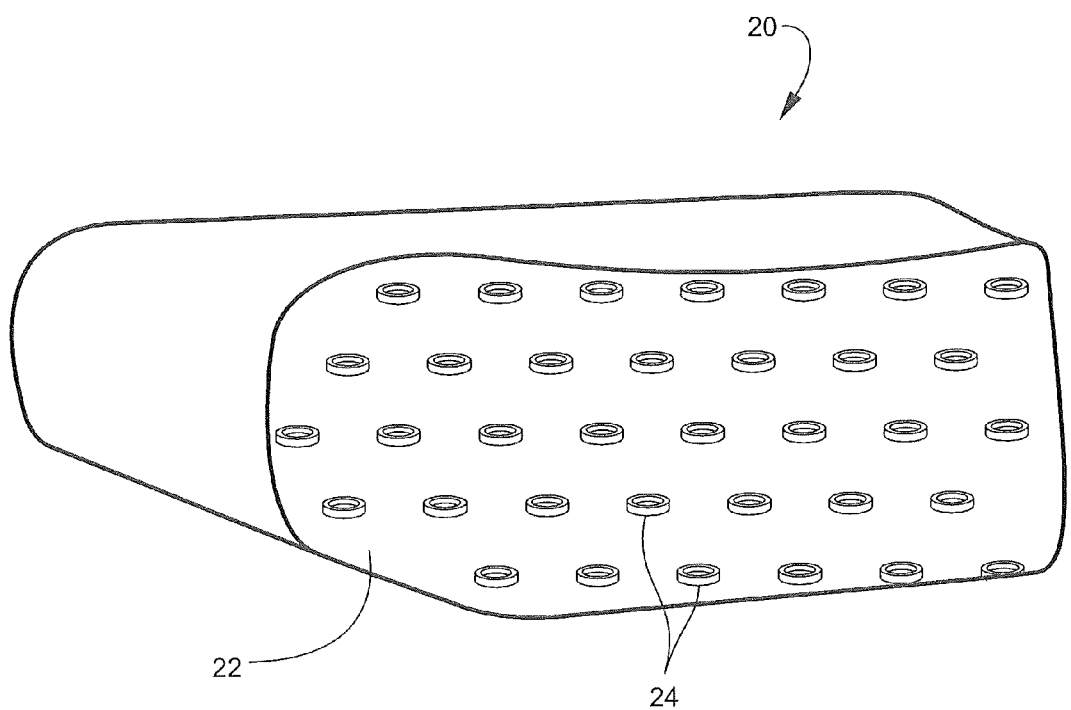
FIG. 1 is a cut-away view of a seat cushion including flotation foam distributed within an open cell cushion according to one embodiment of the invention.

Referring to FIG. 1, a first embodiment of an improved seat cushion is shown generally at reference numeral 20. The seat cushion 20 generally includes a soft open cell foam cushion 22 for comfort having a plurality of closed cell foam pieces 24 distributed within the open cell foam cushion 22 for providing flotation to the seat cushion 20. In the preferred embodiment, the open cell foam cushion 22 is more compressible than the closed cell foam pieces 24. The seat cushion 20 may have any shape.

Figure 2:
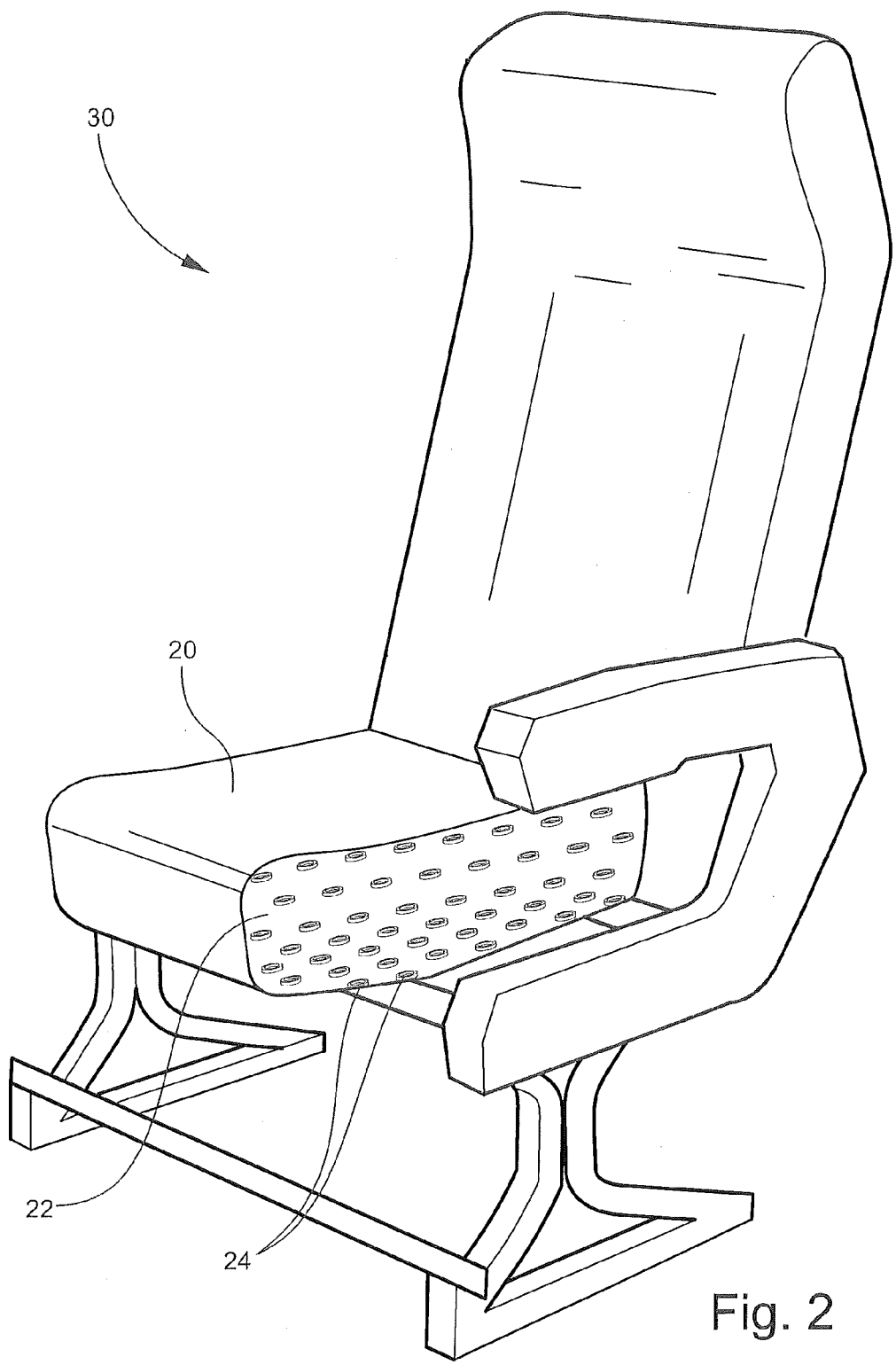
FIG. 2 is a cut-away view of another embodiment of a seat cushion including flotation foam distributed within an open cell cushion.

As shown in FIG. 1, the plurality of closed cell foam pieces 24 may be substantially evenly distributed throughout the open cell foam cushion 22 such that the seat cushion 20 is generally evenly compressible in all directions. As shown in FIG. 2, the plurality of foam pieces 24 may be arranged in an alternative embodiment such that the seat cushion 20 compresses according to a predetermined profile and/or in a predetermined direction. For example, the seat cushion 20 may include a greater density of closed cell foam pieces 24 toward the bottom of the cushion such that the cushion is more resistant to compression the further that it is compressed. This configuration also provides structural support to the bottom of the seat cushion so as to decrease the impulse load to an occupant's lumbar region in an emergency landing scenario. The seat cushion 20 may alternatively and/or in addition include a greater density of closed cell foam pieces 24 near the sides of the cushion to support the edges of the cushion. The seat cushion 20 may also include a predetermined thickness of comfort foam without any closed cell foam pieces 24 near the top of the cushion for improved comfort.

Each of the plurality of closed cell foam pieces ranges in size from about 0.0015 $cm^3$ to about 20 $cm^3$ or even larger, depending on the overall size and thickness of the seat cushion 20. The plurality of closed cell foam pieces 24 collectively comprise about 5 to 50% of the total volume of the seat cushion 20. In one embodiment, the open cell foam cushion 22 is constructed from polyurethane and the plurality of closed cell foam pieces 24 are constructed from polyethylene.

The plurality of closed cell foam pieces 24 each have a predetermined shape that may be the same throughout the seat cushion 20 or may differ, such as by region. In one embodiment, the seat cushion 20 includes a predetermined arrangement of shapes that work cooperatively to provide a predetermined compression profile, resiliency, structural support, buoyancy, etc. The seat cushion 20 may further include one shape adjacent the bottom and/or sides of the cushion and another adjacent the top or near the middle. In addition to improving comfort over conventional flotation cushions, the closed cell foam pieces 24 are spaced apart and distributed within the open cell foam 22 to allow air and moisture to pass through the seat cushion 20.

Figure 3:
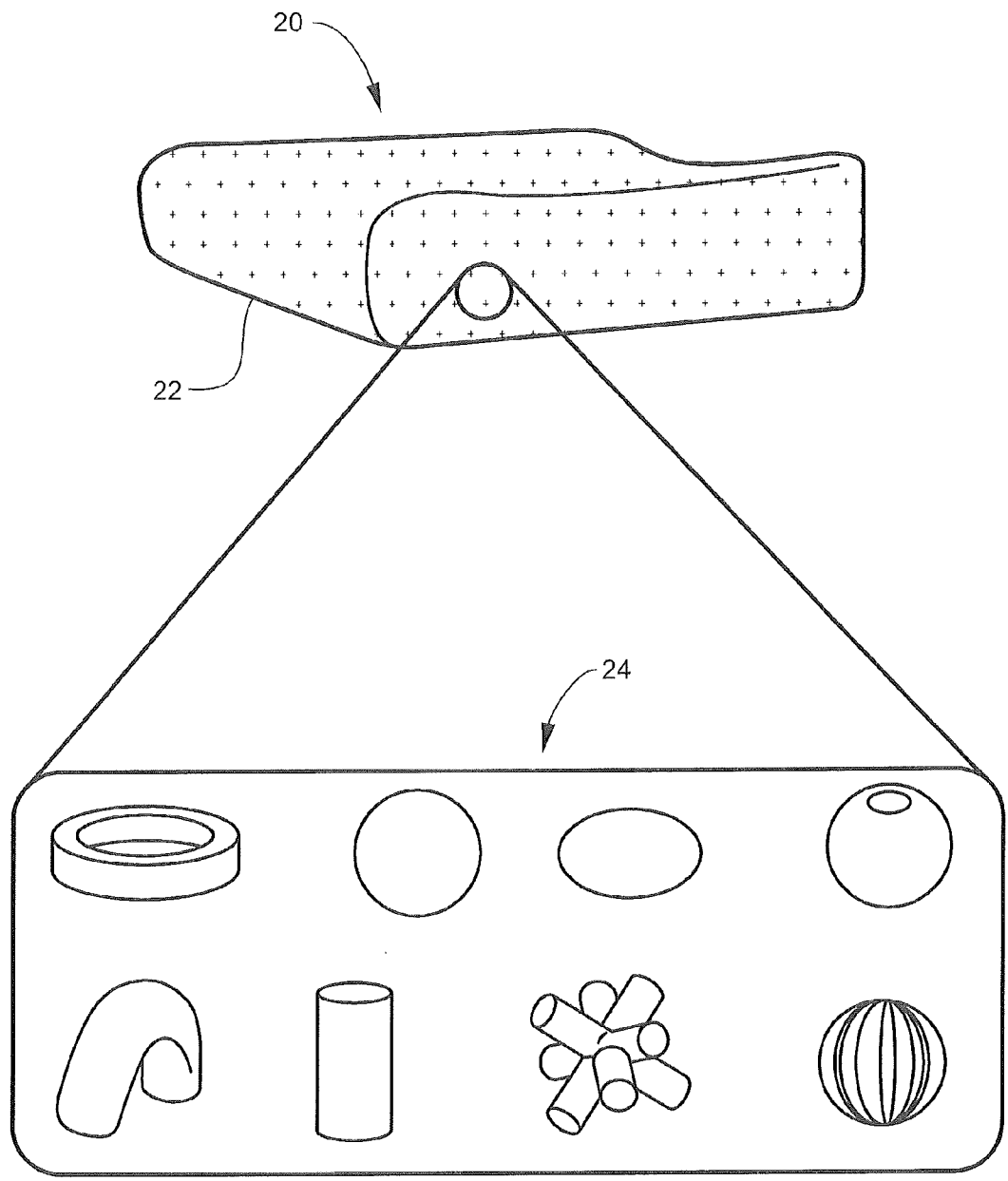
FIG. 3 is a detailed view of a portion of the seat cushion showing alternative flotation foam shapes.
Figure 4:
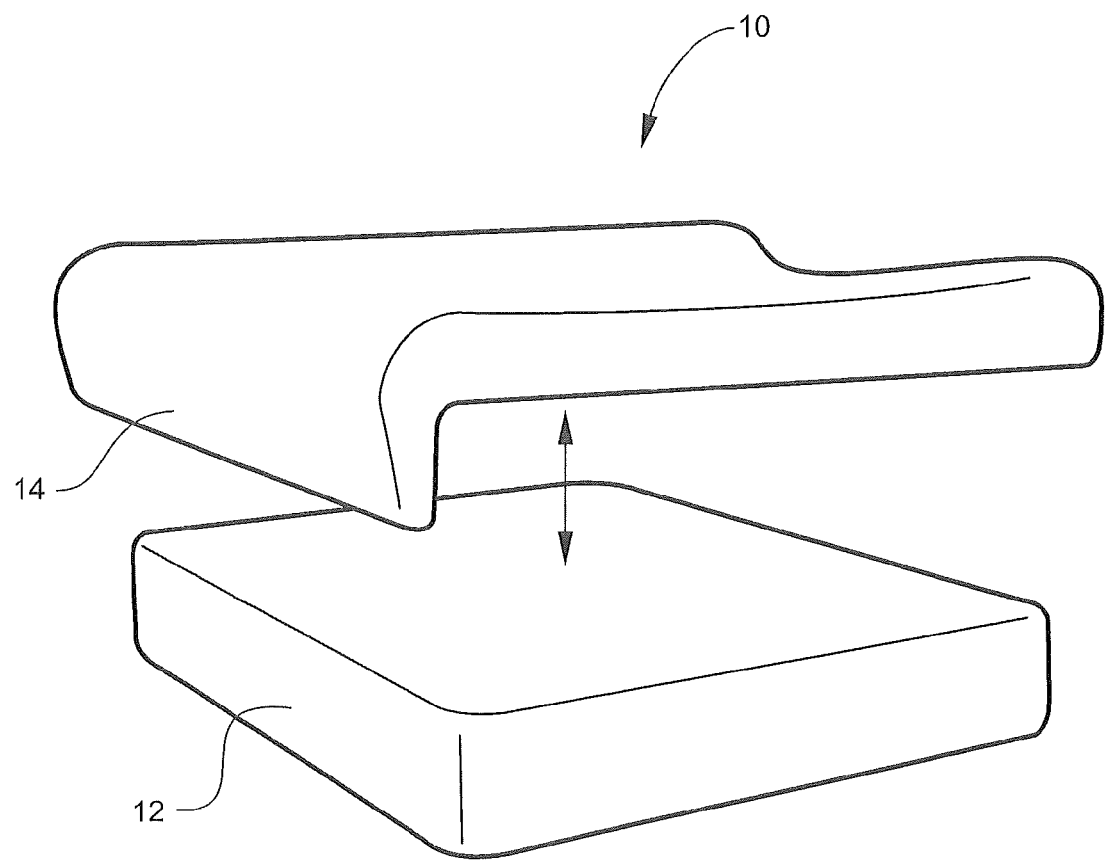
FIG. 4 is a related art seat cushion including flotation foam formed as a pad that is bonded to the underside of a comfort foam and structural foam cushion.

Referring to FIG. 3, exemplary shapes of the plurality of closed cell foam pieces 24 are shown. Shapes may include, but are not limited to, spherical, elongated spherical, cylindrical, tubular, spiral, coiled, donut-shaped, and more complex shapes such as a star mace, cage sphere and sphere with openings, among other. The donut shape is particularly desirable because it has a degree of flexibility and spring that increases the level of comfort and provides resiliency to the seat cushion 20. The donut-shape pieces may be arranged substantially horizontally as shown in FIG. 1, or may be arranged vertically, at an angle or combinations thereof.

In another embodiment, an aircraft seat 30 including at least a bottom seat cushion constructed from comfort foam having a plurality of flotation foam pieces distributed within the comfort foam is provided herein. The volume of flotation foam may be adjusted for FAA flotation device compliance and optimized for passenger comfort and lumbar protection in an emergency landing scenario.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A seat cushion, comprising:
   an open cell foam cushion for passenger comfort; and
   a plurality of closed cell foam pieces distributed within the open cell foam cushion for flotation and structural support, the seat cushion including a greater density of the plurality of closed cell foam pieces adjacent the bottom of the cushion than adjacent the top of the cushion.

2. The seat cushion according to claim 1, wherein the plurality of closed cell foam pieces are spaced apart within the open cell foam cushion.

3. The seat cushion according to claim 1, wherein each of the plurality of closed cell foam pieces ranges in size from about 0.0015 cm$^3$ to about 20 cm$^3$.

4. The seat cushion according to claim 1, wherein the plurality of closed cell foam pieces collectively comprise from about 5 to 50% of the total volume of the seat cushion.

5. The seat cushion according to claim 1, wherein each of the plurality of closed cell foam pieces has substantially the same shape.

6. The seat cushion according to claim 1, wherein at least some of the plurality of closed cell foam pieces have different shapes.

7. The seat cushion according to claim 1, wherein each of the plurality of closed cell foam pieces has a donut shape.

8. The seat cushion according to claim 1, wherein each of the plurality of closed cell foam pieces is shaped like one of a donut, a sphere, a cylinder, a coil, a star shaped mace, a bent tube or a cage sphere.

9. The seat cushion according to claim 1, wherein the open cell foam cushion is constructed from polyurethane and the plurality of closed cell foam pieces are constructed from polyethylene.

10. An aircraft seat cushion, comprising:

a soft foam cushion for providing comfort for a passenger; and a plurality of closed cell foam pieces distributed within the soft foam cushion for flotation and structural support;

wherein the aircraft seat cushion has greater compressibility near a top of the cushion than near a bottom of the cushion.

11. The aircraft seat cushion according to claim 10, wherein the plurality of closed cell foam pieces are spaced apart and substantially evenly distributed within the soft foam cushion.

12. The aircraft seat cushion according to claim 10, wherein the aircraft seat cushion includes a greater density of the plurality of closed cell foam pieces adjacent a bottom of the cushion than it does adjacent a top of the cushion.

13. The aircraft seat cushion according to claim 10, wherein each of the plurality of closed cell foam pieces range in size from about 0.0015 cm$^3$ to about 20 cm$^3$.

14. The aircraft seat cushion according to claim 10, wherein the soft foam cushion is constructed from open cell foam.

15. The aircraft seat cushion according to claim 10, wherein the plurality of closed cell foam pieces collectively comprise from about 5 to 50% of the total volume of the aircraft seat cushion.

16. The aircraft seat cushion according to claim 10, wherein each of the plurality of closed cell foam pieces has substantially the same shape.

17. The aircraft seat cushion according to claim 10, wherein each of the plurality of closed cell foam pieces has a donut shape.

18. The aircraft seat cushion according to claim 10, wherein each of the plurality of closed cell foam pieces is shaped like one of a donut, a sphere, a cylinder, a coil, a star shaped mace, a bent tube or a cage sphere.

19. The aircraft seat cushion according to claim 10, wherein the soft foam cushion is constructed from polyurethane and the plurality of closed cell foam pieces are constructed from polyethylene.

* * * * *